M. S. CUMNER & W. OSTRANDER.
MACHINE TOOL HOLDER.
APPLICATION FILED NOV. 1, 1906.
910,647. Patented Jan. 26, 1909.
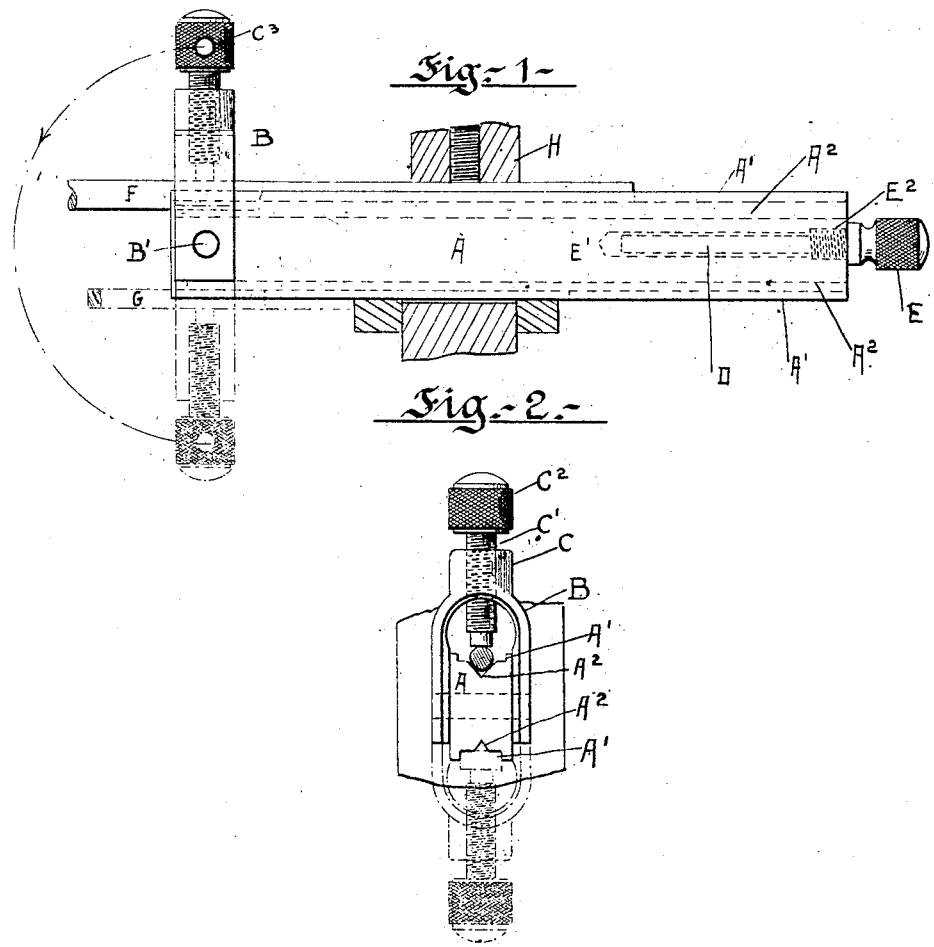

UNITED STATES PATENT OFFICE.

MATTHEW S. CUMNER AND WILLIAM OSTRANDER, OF NEW YORK, N. Y., ASSIGNORS TO NESTOR MANUFACTURING COMPANY, OF NEW YORK, N. Y., A CORPORATION OF NEW YORK.

MACHINE-TOOL HOLDER.

No. 910,647.      Specification of Letters Patent.      Patented Jan. 26, 1909.

Application filed November 1, 1906. Serial No. 341,537.

*To all whom it may concern:*

Be it known that we, MATTHEW S. CUMNER and WILLIAM OSTRANDER, residing in the city of Greater New York, in the county and State of New York, have invented certain new and useful Improvements in Machine-Tool Holders, of which the following is a specification.

Our invention in tool holders relates to that class adapted to be secured in a tool post of such machines as lathes, shapers, planers, boring mills and other metal working machines of this character, and has for its principal object a means for readily adjusting the tool carried thereby to the required position as well as to provide a means for carrying tools having cylindrical shanks as well as a variety of shanks differing in form.

A feature of our invention whereby we are enabled to carry out the object thereof, lies in the novel manner of providing a double recess along the substantially parallel and oppositely situated edges of the body of the holder, and the provision of a terminal swinging clamp which may be adjusted to clamp a tool in either of the said oppositely situated parallel recesses at one terminal of the holder.

Another feature of our invention conducive to facilitating the adjustment of the clamp in initially binding the tool in one of the said recesses, lies in the disposition of the novel key carried by the body of the holder.

These features of our invention are depicted in the drawings forming part of this specification and hereto attached, wherein, Figure 1 is a side elevational view of our improved holder illustrating the clamping of respectively round and square tool shanks in their respective longitudinal recesses of the tool holder shank, and the manner whereby the clamp is swung to engage a tool shank in either of said recesses; and Fig. 2 is an end elevational view thereof.

In both figures, similar characters of reference designate like parts, wherein,

A constitutes the tool shank provided with the substantially parallel and oppositely situated recesses or channels A' and A² respectively for each side. These, however, may be of a variety in form though in the illustrations we have shown but two forms. The recesses A² are shown as V grooves while those as A' appear as rectangular channels.

Carried by and pivotally swung by the tool shank A is a fork B swung upon a stud B' whereby the fork B is adapted to move in the direction of the arrow, Fig. 1, and assume a substantially vertical position over that of the original position as indicated. The fork B is provided with a neck C which is internally threaded to receive a clamp screw C'. The head C² of the clamp screw C' is milled as illustrated, whereby the same may be manipulated and is provided with a perforation C³ to receive the stem D of the key E. This latter is disposed in a cylindrical recess E' formed in the shank A of the tool holder and is secured thereto by a threaded connection E² as indicated by the dotted lines, Fig. 1.

It will be noted by the illustrations that either recess of the tool holder may be employed to clamp the shank of a tool F which in the instance illustrated appears as a cylindrical shank, or a shank G of rectangular formation.

The fragmentary sectional view of a tool post H illustrates the manner of gripping the novel tool holder together with the shank of the tool in securing the whole in position in machines of the variety aforesaid.

Obviously, the novel tool holder may be readily adapted to clamp cylindrical, hexagonal or triangular forms of tool shanks, and the angular adjustment of tools having cylindrical shanks may be readily facilitated whereby the cutting edge of the tool may be set for more or less shear in accordance with the requirement of the work to be performed by the tool, and moreover with our novel tool holder we are enabled to make use of comparatively small pieces of material for the construction of particular boring tools and the like, and to construct these from uniform stock, thereby simplifying the forging and construction of tools for lathes, shapers, planers and the like; while at the same time by our invention we are enabled to more readily adjust their positions in the tool post.

We are aware that prior to our invention, a tool holder having a terminal clamp and a longitudinal groove has been in vogue, and we therefor do not claim these features broadly as our invention, but We do claim as new and desire to secure by Letters Patent of the United States:—

1. A tool holder of the character described, comprising a bar provided with oppositely situated longitudinal recesses, and a terminal swinging clamp adapted to engage a tool in either of the recesses.

2. A tool-holder comprising a bar adapted to hold a tool upon either of two opposite sides, and a clamping member pivoted to the bar and adapted to be swung over one end thereof to coöperate with either of said grooves.

3. A tool-holder, comprising a bar and a clamping means pivotally mounted upon said bar, and arranged to be swung so as to hold a tool upon either of two opposite sides of the bar.

In testimony whereof, we have signed our names to this specification, in the presence of two subscribing witnesses.

MATTHEW S. CUMNER.
WILLIAM OSTRANDER.

Witnesses:
PHILIP K. STERN,
J. WALLACE CARTER.